UNITED STATES PATENT OFFICE.

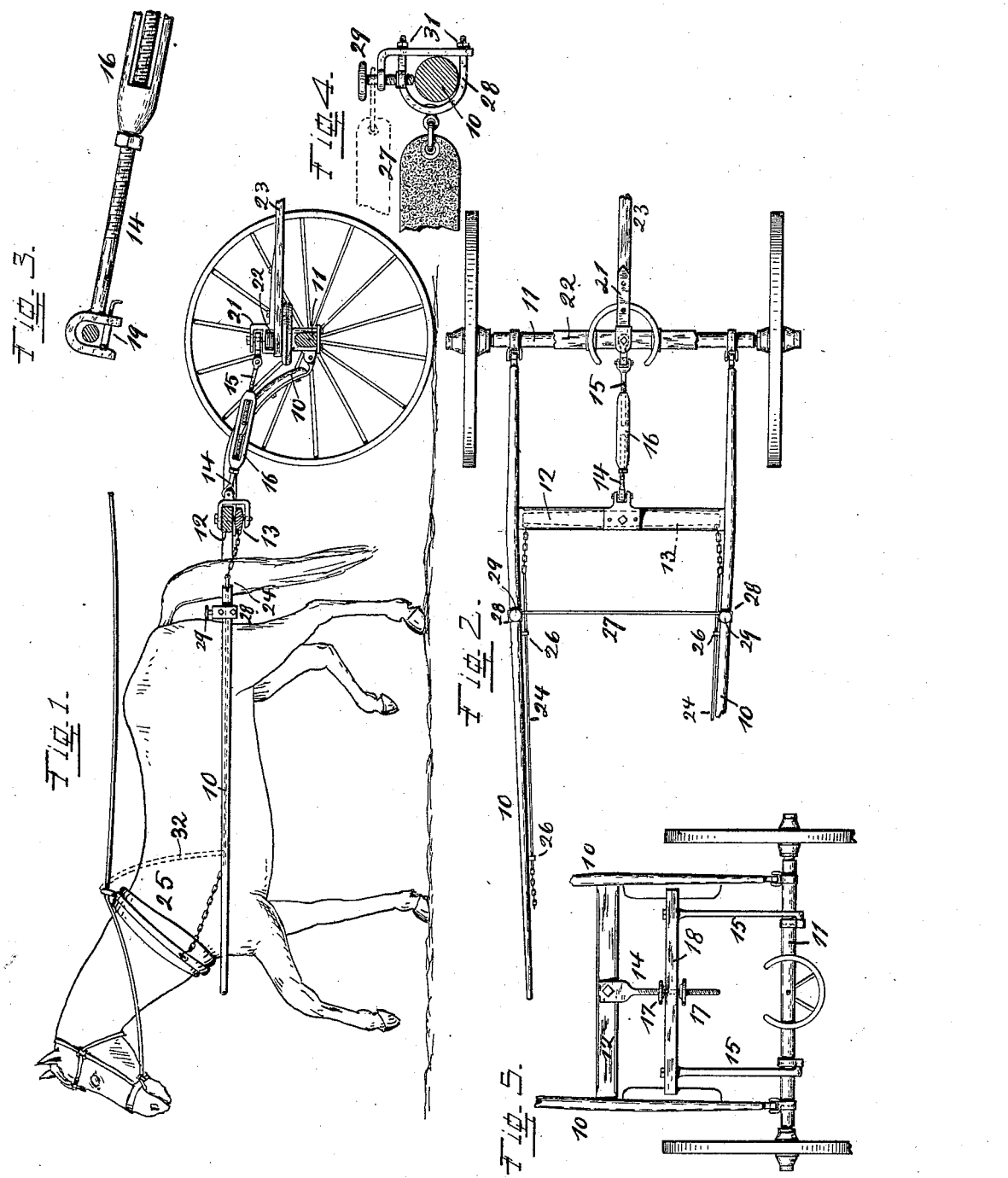

WILLIAM J. DREES, OF COVINGTON, KENTUCKY.

DRAFT-RIGGING FOR VEHICLES.

No. 841,132.  Specification of Letters Patent.  Patented Jan. 15, 1907.

Application filed December 29, 1905. Serial No. 293,818.

*To all whom it may concern:*

Be it known that I, WILLIAM J. DREES, a citizen of the United States, residing at Covington, Kenton county, State of Kentucky, have invented a certain new and useful Draft-Rigging; and I do declare the following to be a clear, full, and exact description of the invention, attention being called to the accompanying drawings, with the reference characters marked thereon, which form also a part of this specification.

This invention relates to a certain new and useful draft-rigging to be used for hitching draft-animals, more particularly horses, to vehicles, the rigging to take the place of the usual harness outfit and to form permanently-connected parts of the vehicle.

The invention consists of the means and devices and their particular construction, as the same, together with the manner of use, is hereinafter described and claimed and as shown in the accompanying drawings, in which—

Figure 1 in side elevation, partly in section, shows my draft-rigging and its manner of application. Fig. 2 is a top view thereof. Figs. 3 and 4 in enlarged detail views show the construction of certain parts which are more fully explained hereinafter. Fig. 5, in part of a view similar to Fig. 2, shows a modified construction of certain parts.

My invention is shown and described in connection with a vehicle provided with two shafts 10 10 to permit hitching of a horse between. The rear ends of these shafts connect in the usual manner to the vehicle, generally to axle 11 thereof, as best shown in Fig. 1. 12 is a cross-bar which connects these two shafts, and below it there is a swingletree 13. In place of the usual gig-saddle and shaft-tugs carried by the horse and whereby the shafts are held up, the weight being carried by the horse, I provide for such purpose means, which attach to parts of the vehicle, so that no weight is carried by the horse and saddle and tugs are entirely dispensed with. These means consist of a screw-rod 14, attached to cross-bar 12 and connecting to parts of the vehicle by a link 15 at a point which should be above the point where the rear ends of the shaft are attached. In Fig. 1 one link is shown, while in the modified construction of Fig. 5 two appear. The connection between links and screw-rod is by nuts to permit adjustment. In Fig. 1 a knuckle-joint 16 is shown. In Fig. 5 two screw-wheels 17 operate in conjunction with a bar 18. It will now be seen that by manipulation of this knuckle-joint or by the screw-wheels the shafts may be raised or lowered to suit the height of the horse, and they are also held thereafter in this adjusted position, so that no weight is on the back of the horse. In the form shown in Figs. 1 and 2 the shafts are shown as detachable from these adjusting means, (see locking-pin 19 in Fig. 3,) which permits after disconnection a lowering or raising of the shafts to a vertical position to be out of the way when the vehicle is not used or to permit placing of the horse for hitching up. The attachment of links 15 to the vehicle may be in any suitable way. In Figs. 1 and 2 it is shown by a fitting 21, which is shaped to clear spring 22 and is attached to the reach 23. The connection of link 15 to this fitting is by a swivel-joint, so as to permit movement for turning of the vehicle as well as for raising or lowering of the shafts during their adjustment.

In Fig. 5 the connection of links 15 is presumed to be directly to the axle and requires, therefore, no provision for independent turning. To attach the horse for pulling, I use draft-links 24 in place of the usual traces, which links are permanently carried by the shafts. Their rear ends connect to the swingletree and their front ends to the hame or collar 25 of the horse. In detail, these links consist of rods carried in lugs 26, so as to be free to slide, and having at each end short pieces of chain to provide for a flexible connection to the swingletree and to the collar. As will be understood, these draft-links remain in position on the shafts, are therefore always at hand, and do not encumber the horse. In place of breeching and backing-strap now carried by the horse and forming a part of the harness I use a backing-strap 27, stretched across the space between the two shafts. In order to suit the position of the horse, the connection at the ends of this strap to the shafts is made adjustable by couplings 28 28, fitted to slide on shafts 10, and may be held in their adjusted position by set-screws 29. (See Fig. 4.) They may also be tightened by nuts 31 for a more permanent connection. The connection of the ends of this backing-strap may be direct to couplings 28, as shown, or to set-screws 29, as shown in dotted lines. It will now be seen that outside of a collar nothing is used which attaches to the body of the horse or is carried by it, and the same is left entirely free and unincumbered. The collar and hame might also go with the shafts after opened up to permit disconnection by being supported on an arched bow 32, bridging the shafts, which feature would come particularly in consideration when this outfit is to be used in connection with fire-department apparatuses. (See dotted lines in Fig. 1.)

Having described my invention, I claim as new—

1. In a draft-rigging, the combination of shafts hingedly attached to a vehicle and provided with a cross-bar between them, of a screw-rod connected to this cross-bar and projecting rearwardly therefrom, a link connected to the vehicle and intermediate means for adjustably connecting screw-rod and link.

2. In a draft-rigging, the combination with the shafts and a swingletree, of draft-links to connect the draft-animal to the swingletree means to support these draft-links permanently on the shafts and flexible chain connections, one at each end of each link, to connect them at their rear ends to the swingletree and at their front ends to the horse-collar.

3. In a draft-rigging, the combination of the shafts, a backing-strap stretched across the space between them and couplings adjustably mounted on the shafts and to which couplings the ends of the straps are attached and held taut between them.

4. In a draft-rigging, the combination with the shafts and a swingletree, of draft-links carried by the shafts and adapted to attach the draft-animal to the swingletree a backing-strap adjustably stretched between these shafts and means connected to the vehicle to support the shafts in a fixed position independent of the draft-animal.

5. In a draft-rigging, the combination of shafts hingedly attached to a vehicle and provided with a cross-bar between them, a screw-rod projecting rearwardly from this bar, a link projecting forwardly from the vehicle, having its forward end threaded, a fitting whereby this link is connected to the vehicle with a swivel-joint and a knuckle-joint connecting the threaded end of the link to the rear end of the screw-rod.

In testimony whereof I hereunto affix my signature in the presence of two witnesses.

WILLIAM J. DREES.

Witnesses:
C. SPENGEL,
C. MEYER.